Oct. 25, 1932.     C. L. KINGSBAKER     1,883,946
CHARCOAL BROILER
Filed Dec. 21, 1931

WITNESSES
A. B. Wallace.
V. A. Peckham.

INVENTOR
Clyde L. Kingsbaker
by Brown & Critchlow
his attorneys

Patented Oct. 25, 1932

1,883,946

UNITED STATES PATENT OFFICE

CLYDE L. KINGSBAKER, OF PITTSBURGH, PENNSYLVANIA

CHARCOAL BROILER

Application filed December 21, 1931. Serial No. 582,212.

This invention relates to charcoal broilers, and more particularly to broilers suitable for domestic use.

Steaks or other meats are improved in flavor by broiling them over a charcoal fire, the intense heat from the burning charcoal immediately searing the outside of the meat, thereby closing the pores and preventing the natural juice of the meat from escaping while it is being cooked. However, due to the fact that most, if not all, charcoal broilers now in use are unsuited for domestic use because of size or inconvenience, the serving of charcoal broiled steaks is generally confined to restaurants, hotel dining rooms, and other public eating places. Consequently, to enjoy a good steak broiled over charcoal, one must eat a meal away from home and be subjected to its added expense besides the inconvenience of not being able to have charcoal broiled meat at home at will.

It is, therefore, an object of this invention to provide a charcoal broiler which is adapted for use in the home, is portable, compact, convenient to use, simple in construction, and which can be used without creating any dirt.

Figure 1:
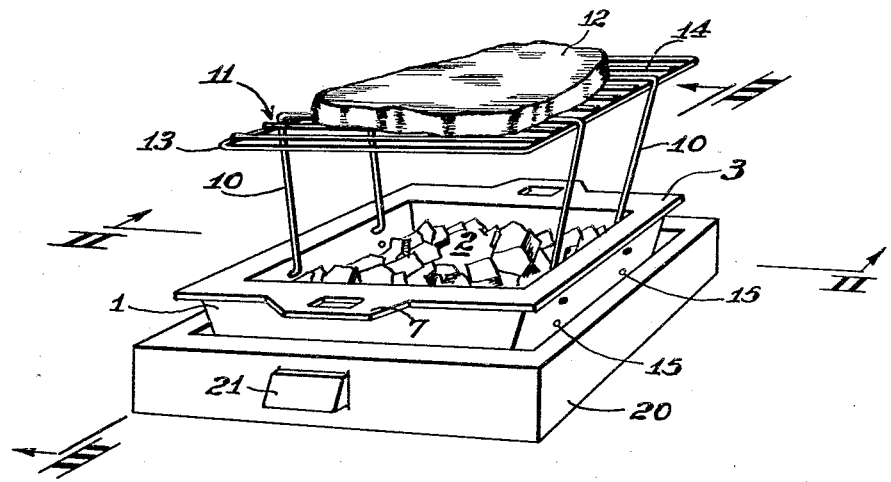
Figure 2:
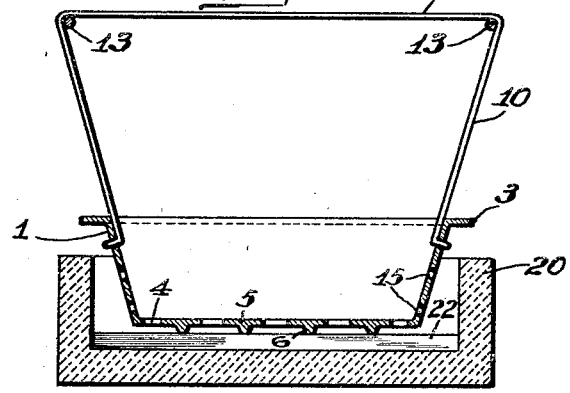
Figure 3:
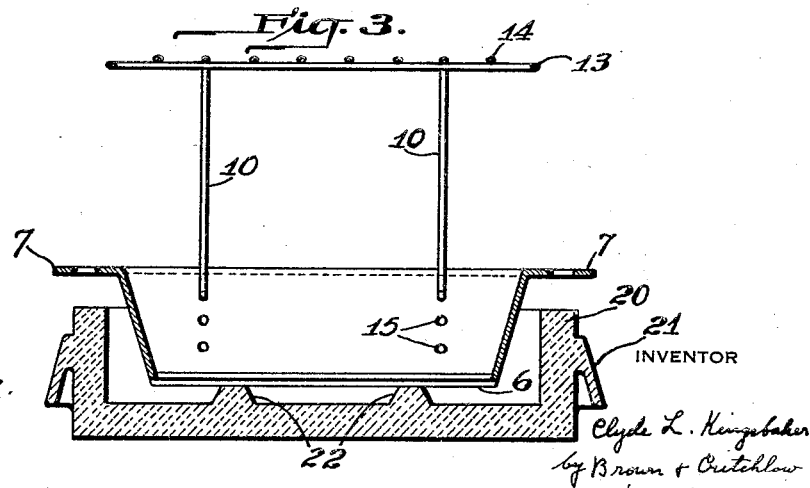

The invention is illustrated in the accompanying drawing of which Fig. 1 is a perspective view of the preferred embodiment; Fig. 2 a sectional view taken on the plane represented by the line II—II of Fig. 1; and Fig. 3 a sectional view taken on the plane represented by the line III—III of Fig. 1.

Referring to the drawing, a fuel receptacle or pan 1, preferably a rectangular casting adapted to hold a supply of charcoal 2 and having a marginal flange 3 extending outward from its upper edge, is provided with a grate-like base, that is, a base provided with a plurality of parallel slots 4 extending longitudinally thereof and dividing it into a plurality of bars 5. These bars support charcoal while the slots permit air currents to pass upward through the base of the pan to create a draft. To make it possible for air to circulate beneath the pan when it is resting on a flat surface, the base of the pan is spaced from its support by means of longitudinal integral ribs 6 extending downward from bars 5. Handles 7 extend outward from flange 3 at each end of the pan to facilitate handling of it.

Supported above the pan or charcoal receptacle by means of legs 10 is a grill 11 adapted to support a steak 12 or other meat over the charcoal 2, the grill being formed of a rectangular frame 13 of heavy wire with a plurality of equally spaced parallel cross wires or rods 14 securely attached to the sides thereof, such as by welding. Two of these rods extend beyond the frame sides and are bent downward to form four resilient legs 10, the lower ends of which are bent outward in substantially a horizontal plane. Each side of the pan is preferably provided with two vertically disposed substantially parallel sets of holes 15 for receiving the horizontally disposed lower ends of legs 10, whereby grill 11 may be supported in vertically adjustable positions above the charcoal pan 1. The resiliency of legs 10 holds them in holes 15, and permits them to be easily removed at will to alter the vertical position of the grill or to clean it. The proper vertical position of the grill in relation to the pan depends in part upon the amount of charcoal in the pan, and can best be determined by experience.

As one of the objects of this invention is to provide a charcoal broiler that is suitable for use in the home, it is highly desirable to provide a receptacle for catching the ashes that fall between bars 5 of the charcoal pan and for protecting a table or other support against being burned or otherwise injured by the heat of the burning charcoal. This ash and protecting receptacle or tray 20 is made in the same general shape as the charcoal pan, but slightly larger to permit the pan to be set in it, and is preferably constructed of a refractory material for the purpose stated. The tray is provided at each end with a handle 21, and its appearance may be improved by a stucco finish. It is also preferable to provide the upper face of the tray's base with a pair of integral transverse ribs 22 extending upward therefrom, to increase the air circulation beneath the pan by providing substantial point contacts between ribs 6 and the base of the tray. The tops of ribs 22 are flattened to minimize their tendency to crumble when engaged by ribs 6 of the pan.

In using this charcoal broiler a supply of charcoal is placed in pan 1 and distributed evenly over the grate-like base while the pan is resting in ash tray 20 which catches any fine pieces of charcoal that happen to fall through slots 4 of the base. If the user has a gas or like fluid burner range, the pan is then removed from the tray and placed over a burner of the range, the flame from the burner being turned up high enough to reach the charcoal which it soon ignites. After the charcoal has caught fire the pan is again placed in the tray and the entire device may be transferred into the oven of the range where unpleasant odors are carried away. In about thirty minutes all of the charcoal will be burning with a small blue flame, and it is then time to place steak 12 on grill 11 for broiling. When the steak is properly cooked it is removed from the grill and the charcoal permitted to burn out, all the ashes being collected in the tray which can then be emptied without creating any dirt.

For use with electric ranges where there are no flames to ignite the charcoal, the pan is not removed from the tray but is immediately put in the oven. A small amount of so-called "canned heat", such as nitro-cellulose saturated with alcohol, may then be applied to the charcoal and ignited, the charcoal being ignited by the burning thereof. This broiler can likewise be used just as effectively in an open fireplace, or in the open country while camping, its small size and compactness rendering it convenient to carry.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. A broiler comprising a fuel receptacle having a grate-like base, two opposite sides of said receptacle being provided with a plurality of spaced apertures, a grill disposed above said receptacle, and downward extending legs secured to said grill with their lower ends projecting into said apertures for supporting said grill above said receptacle.

2. A broiler comprising a charcoal receptacle having a grate-like base provided with projections for spacing it from a support, two opposite sides of said receptacle being provided with a plurality of apertures disposed at vertically spaced intervals in substantially parallel sets, a grill disposed above said receptacle, and downward extending resilient legs secured to said grill with their lower ends projecting into said apertures for removably supporting said grill in vertically adjustable positions above said receptacle.

3. A broiler comprising a charcoal receptacle having a grate-like base, a plurality of downward projecting ribs integral with said base for spacing it from its support two opposite sides of said receptacle being provided with a plurality of apertures disposed at vertically spaced intervals in substantially parallel sets, a grill disposed above said receptacle, and downward extending resilient legs secured to said grill with their lower ends projecting into said apertures for removably supporting the grill in vertically adjustable positions above said receptacle.

4. A broiler comprising a charcoal receptacle having a grate-like base, a plurality of downward projecting ribs integral with said base for spacing it from its support, two opposite sides of said receptacle being provided with a plurality of spaced apertures, and a grill comprising a frame with a plurality of spaced rods secured across it, at least two of said rods extending beyond said frame and being bent downward to form resilient legs with their lower ends projecting into said apertures for removably supporting said grill in vertically adjustable positions above said receptacle.

5. The combination of a charcoal broiler comprising a charcoal pan having a grate-like base, a grill disposed above said pan, downward extending legs secured to said grill and pan for supporting the grill above the pan, and an ash tray for receiving said pan and having a plurality of upward extending ribs integral with its base for supporting and spacing said pan from said tray to permit air currents to circulate beneath and through said grate-like base of the pan.

6. The combination of a charcoal broiler comprising a charcoal pan having a grate-like base, a plurality of downward projecting ribs integral with said base for spacing it from its support, two opposite sides of said pan being provided with a plurality of apertures disposed at vertically spaced intervals in substantially parallel sets, a grill disposed above said pan, downward extending resilient legs secured to said grill with their lower ends projecting into said apertures for removably supporting said grill in vertically adjustable positions above said pan, and an ash tray for receiving said pan and having a plurality of upward extending ribs integral with its base for supporting and spacing said pan from said tray to permit air currents to circulate beneath and through said grate-like base of the pan.

In testimony whereof, I sign my name.

CLYDE L. KINGSBAKER.